United States Patent

Borner et al.

[15] 3,636,529

[45] Jan. 18, 1972

[54] DRUM STORAGE SYSTEM WITH ALTERNATING LIGHT BEAMS

[72] Inventors: Manfred Borner, Ulm (Danube); Stefan Maslowski, Aufhein, Neu-Ulm, both of Germany

[73] Assignee: Telefunken Patentverwertungsgesellschaft m.b.H., Ulm (Danube), Germany

[22] Filed: Feb. 13, 1969

[21] Appl. No.: 798,882

[30] Foreign Application Priority Data

Feb. 13, 1968 Germany ......................P 15 74 490.8

[52] U.S. Cl. ..................340/173 LM, 340/173 LS, 346/76 L

[51] Int. Cl. ...............G11c 13/04, G01d 15/14, G01d 15/28

[58] Field of Search ................340/173 R, 173 LM; 350/160, 350/160 P, 6, 7, 285; 346/76 L, 108, 138; 352/141, 212; 178/7.6

[56] References Cited

UNITED STATES PATENTS

| | | | |
|---|---|---|---|
| 2,997,539 | 8/1961 | Blackstone | 350/6 X |
| 3,142,528 | 7/1964 | Stafford | 350/285 X |
| 3,229,047 | 1/1966 | Simpson | 340/173 X |
| 3,253,497 | 5/1966 | Dreyer | 88/1 |
| 3,256,524 | 6/1966 | Stauffer | 346/76 |
| 3,408,634 | 10/1968 | Lee | 340/173 |
| 3,474,457 | 10/1969 | Becker | 346/76 |

OTHER PUBLICATIONS

Tippett, Optical and Electro-Optical Information Processing, 1965, MIT Press, p. 21.

Kulcke, A Fast, Digital-Indexed Light Deflector, 1/64, IBM Journal, pp. 64– 67.

Nelson, Digital Light Deflection, The Bell System Technical Journal, 5/64, pp. 821– 845.

*Primary Examiner*—Bernard Konick
*Assistant Examiner*—Stuart Hecker
*Attorney*—Spencer & Kaye

[57] ABSTRACT

In a data system having a large store capacity and short access time a rotating drum is provided the surface of which is covered with a recording material which changes color under the influence of light beams. Other features relate to arrangements for associating the data flow to a plurality of light beams.

9 Claims, 2 Drawing Figures

INVENTORS
Manfred Börner &
Stefan Maslowski

BY Spencer & Kaye
ATTORNEYS

DRUM STORAGE SYSTEM WITH ALTERNATING LIGHT BEAMS

BACKGROUND OF THE INVENTION

The present invention relates to a data storage system with large store capacity and short access time.

Electronic data-processing systems of larger dimensions require correspondingly large stores. Conventional large-capacity stores, such as magnetic disc stores or magnetic tape stores, either require a relatively large amount of space or the average access time becomes so long that their use as primary store becomes uneconomical so that they can be considered only as secondary and tertiary stores. Although the requirements for the average access time might be considerably low for secondary stores since the transfer of data into the primary store can be effected during the dead times of the entire system, a decrease in these access times is nevertheless desirable.

It is also desired to reduce the space requirement for such large-capacity stores.

In this connection, proposals have become known to utilize for data recording the discoloration of certain recording substances, which are mostly organic in nature, under the influence of high-energy radiation.

This discoloration reaction requires a relatively high radiation energy or, with low energies, a correspondingly longer period of irradiation. However, the recording data presently realizable with high-energy laser beams, for example, are such, that this type of storage can be considered to be definitely technically usable.

It has been proposed to construct the stores with the above-mentioned substances in the form of film strips. This means that the recording substance is applied onto a long tension-proof carrier. In this type of store construction the following drawbacks appear.

First of all, the average access time is relatively long, as with magnetic tapes, and then accurate guiding of the tape is extremely difficult with the required high tape speeds. This accurate tape guidance is necessary particularly because the irradiation with laser light leads to very narrow light tracks when compared with the dimensions of the tape surface so that the data density can be increased; but, on the other hand, the recording track must be exactly positioned in order to be read out.

The principle of a rotating drum whose outer surface is covered with recorded data has been known for a long time in the magnetic art. In this technique the outer surface is coated with a magnetizable layer. The recording tracks are arranged one alongside the other on the periphery of the drum and one magnetic head is provided per track. The store capacity of such a magnetic drum store is determined by the number of tracks, the size of the periphery and the rotational speed of the drum. The access time is substantially determined by the rotational speed of the drum.

Such drum stores no longer have any significance in present-day data processing systems due to their low capacity and their relatively long access times. A further reason to depart from this technique is that it is difficult to position the magnetic head, with a relatively rapidly rotating drum, in such a manner that contact with the magnetic layer remains uniform over the entire length of each track.

Therefore, magnetic drum stores are considered to be an outmoded storage medium.

SUMMARY OF THE INVENTION

It is an object of this invention to provide data storage which eliminates these disadvantages of the prior art.

Another object of the present invention is to provide a data storage system which occupies less space than known magnetic disc storage systems of the same storage capacity.

A further object of the present invention is to provide a light-sensitive storage system in which greater light intensities can be utilized.

Still another object of the present invention is to provide a data storage method and arrangement having reduced access time and using a relatively simple construction of the mechanical and electrical assemblies utilized.

These objects and others are accomplished by the following combination:

a. a recording substance which is provided as a data carrier and which changes color under the influence of high-energy radiation; and b. The recording substance is applied to the outer surface of a rotatable drum.

DESCRIPTION OF THE PREFERRED EMBODIMENTS

Figure 1:
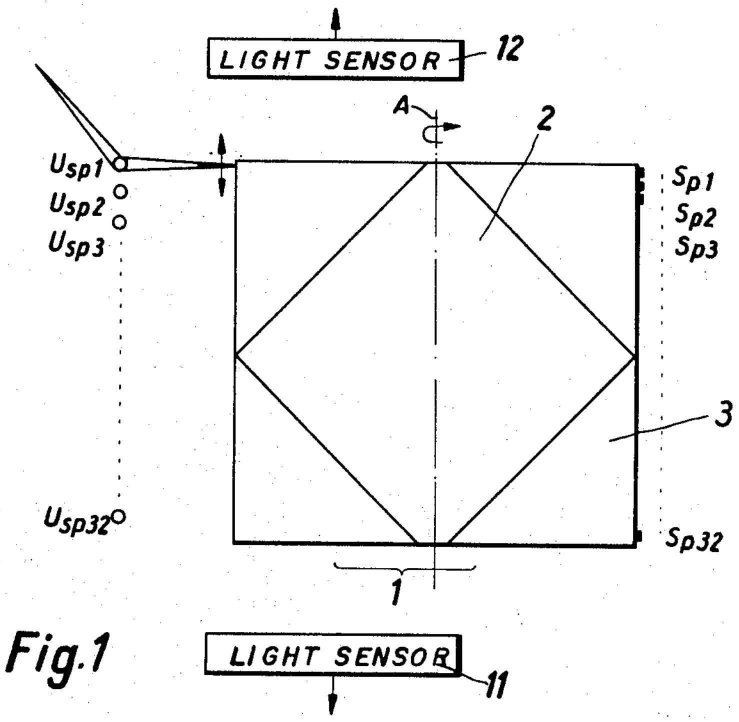
FIG. 1 is a schematic view of the drum and the associated light reflectors and light sensors of the present invention.

FIG. 1 shows the rotating drum 1. The drum rotates at, e.g., 24,000 revolutions per minute around its longitudinal axis A. It is constructed of two parts. An inner core 2 is in the form of a double cone or of a double frustum (the bases of both individual cones meet). The surface of this double cone is reflective. The outer part is constructed as a hollow portion 3, which, placed on top of the double cone, forms the cylindrical total drum body therewith. This hollow portion 3 is made of transparent material (glass, Plexiglass or the like). Parallel groups of tracks Sp are arranged on the outer surface (with a height of the drum body of e.g., 66 mm., e.g., 32 groups of tracks Spl...Sp32). Each one of these groups of tracks Sp has its associated information channel; each group of tracks contains, e.g., 175 individual tracks. A light-sensitive substance which is transparent but discolors when certain types of light radiation impinge upon it is placed onto the circumference of drum 1. This can be done in the following way. The light-sensitive substance is solved in an organic solvent. The solution is applied upon the drum 1, and then the solvent is evaporated.

The light beam causing the discoloration of the light-sensitive substance is converged by a lens and deflected by a small deflection mirror Usp so that it is focused on the light-sensitive surface of the storage body.

Advisably, one deflection mirror Usp is provided for each group of tracks Sp which is then responsible for the adjustment of the light bundle to the individual tracks of the group of tracks The deflection mirror Usp can advantageously be provided in the form of a galvanometer as is used, for example, in light beam oscillographs. Its deflection angle can be adjusted by varying the current fed thereto.

Assuming a light wavelength of 0.351 $\mu$ (continuous argon or crypton ultraviolet ion gas laser) and a light bundle diameter of 1.6 mm. on the deflection mirror, the diameter of the focal point will be approximately 3 $\mu$ when the distance between the deflecting means and the store layer is 20 mm. The depth of focus here is in the range of 30–50 $\mu$.

Figure 2:
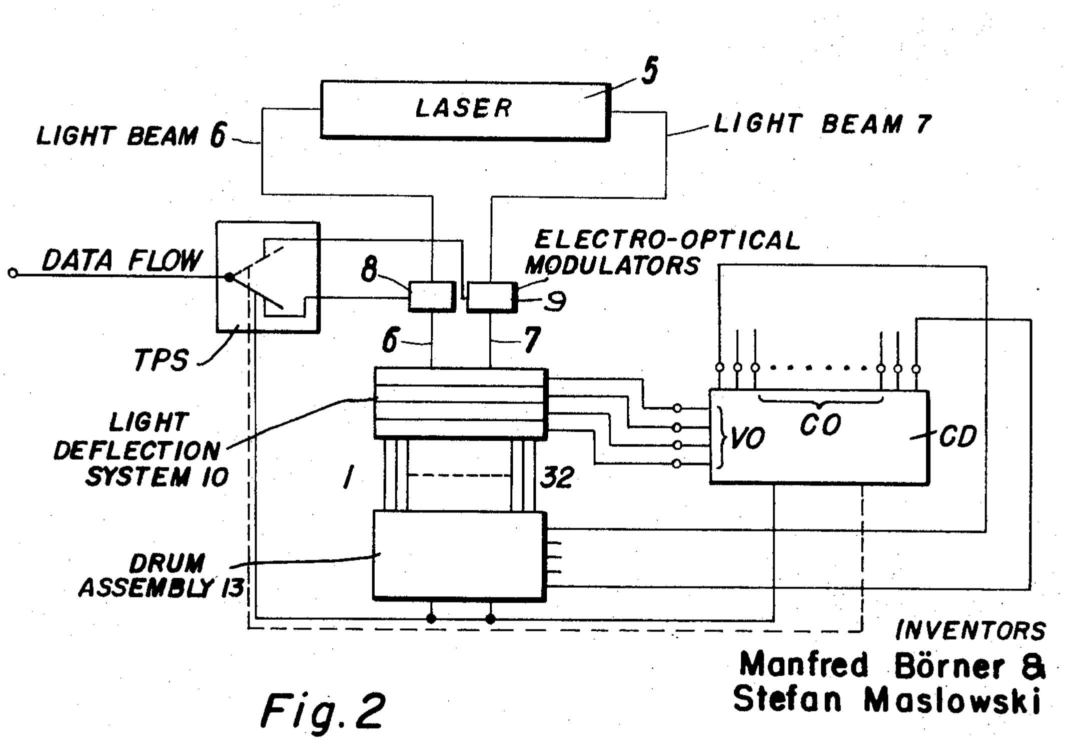
FIG. 2 is a block diagram of the data storage system of the present invention.

FIG. 2 is a block circuit diagram of a total store system which utilizes the drum store of the present invention in an advantageous manner. The light source is a laser 5 which emits two diverging light beams 6, 7. Each one of these light beams 6, 7 may be modulated by an electro-optical modulator 8 or 9, respectively in the timing of the data flow. The data to be stored may be switchably fed into one of the two modulators. Therefore, there is provided a two-position switch TPS, e.g., a relay, which can be controlled by contacts actuated appropriate to the rotating of the drum.

After passing through the modulators 8 or 9, respectively, the light beams 6, 7 pass through a digital electro-optical light deflection system 10 with four deflection stages. Such a digital light deflection system is known, for example, from IBM J. Res. Dev. 8 (1964). 64, W. Kulcke, T. J. Harris, K. Kosanke, E. Max, "A Fast Digital-Indexed Light Deflector" or from Bell Syst. Tech. J. 43 (1964), 821, T. J. Nelson, "Digital Light Deflection." It is, however, also possible to employ other solutions, for example, mirror assemblies.

In the present case the light deflection system 10 is assumed to comprise four deflection stages. Thus, it is possible, depending on the control of the light deflection system, to position each one of the two light beams to one of $2^4=16$ positions. The total number of optical channels which are thus available is 32 which corresponds to the number of groups of tracks Sp on the drum according to FIG. 1. One of these optical channels or one of the groups of tracks is the carrier of the data flow to be stored. Shifting from one channel to another by means of the light deflection system can be accomplished very rapidly, for example, in 10 $\mu$ sec. or with appropriate steps in even shorter time.

After passing through the light deflection system, the laser beam is conducted, via the deflection mirrors (Uspl... Usp 32) mentioned in connection with FIG. 1, to the drum store.

Several details with reference to the elements employed as well as the store capacity and access time realizable with one specific embodiment of the data storage system according to the present invention will be discussed in detail below.

The laser 5 is preferably the type which operates in the ultraviolet range, for example, an argon, crypton or neon laser. These are all ion gas lasers with which relatively high light intensity can be realized. It is also possible to operate these lasers at different wavelengths corresponding to the emission lines.

Electro-optical crystals are available as modulators 8, 9. The voltages required to control these crystals are relatively high and are proportional to the light wavelength. For this reason, the use of laser light in the ultraviolet range is particularly advantageous.

The galvanometer mirrors which are to be used as deflection mirrors Usp make possible a deflection angle range of, e.g., 2.5° or more and a limit frequency of, e.g., 2 kHz. or more. With the above data (distance of the deflection mirror from the storage layer = 20 mm., light wavelength = 0.351 $\mu$, focal point diameter = 3$\mu$) and a deflection angle range for the mirror of 2.5° (i.e., light deflection range 5°) this results in a height of the group of tracks of 1.75 mm. Assuming a spacing of 2 mm. between each individual group of tracks and the next the total height of the drum store amounts to approximately 66 mm.

In the individual track the store points (diameter 3 $\mu$) are spaced at a distance of 3.5 $\mu$. In this way $$70\cdot\pi/3.5\cdot10^{-3}=6.25\cdot10^4$$

bits can be stored in one track on a drum having a diameter of 70 mm.

The store capacity is then as follows:

$6.25\cdot10^4$ bits per individual track;

$6.25\cdot10^4\cdot175=1.095\cdot10^7$ bits per group of tracks;

$1.095\cdot10^7\cdot32=3.5\cdot10^8$ bits on one drum 1.

The writing or reading speed, respectively is determined by the rotational speed (here 24,000 revolutions per minute) and by the number of bits per individual track:

$6.25\cdot10^4\cdot400=2.5\cdot10^7$ bits per second

The access time $\tau$ is composed of three parts:

$$\tau=\tau_{rot}+\tau_{track}+\tau_{group\ of\ tracks}\,.$$

The part $\tau_{group\ of\ tracks}$ which is required to shift the light deflection system to the desired group of tracks, is here, at e.g., 10 $\mu$ sec., negligible with respect to the other two parts. $\tau_{track}$ is the time required to adjust the deflection mirror to the desired individual track of a group of tracks. With an assumed limit frequency for the deflection mirror of 2 kHz., this time is approximately 0.5 msec. The largest portion is furnished by the location of the data in an individual track based on the rotation of the drum. A full revolution takes 2.5 msec. The average of this part is thus 1.25 msec.

In summary, it can be stated with respect to the access time that it is at maximum about 3 msec, with an average of <2 msec.

The following will discuss the writing and reading process.

The data to be stored are modulated onto one of the two light beams 6, 7 emitted by the laser, e.g., onto light beam 6, in one of the modulators, e.g., in modulator 8, whereas the other modulator 9 keeps the second light beam 7 switched off.

The data are assigned to one of the modulators by the switch TPS. Modulators which block the light beam while there is no data input, are available, e.g., from Westinghouse Electric Corporation (Model LPC–101). The positioning of the light beam onto the drum 1 is effected by a control device CD, which has a counting stage for counting the rotations of the drum 1, for instance, by using the above-mentioned contacts, and which has four voltage outputs (VO) and 32 current outputs (CO). The four voltages are used as input voltages for the four stages of the digital light deflection system 10. Thus the light beams 6 and 7 respectively can be supplied to the deflection mirrors Usp 1 to 16 or 17 to 32 respectively in a well-known manner, see, e.g., Deutsche Auslegeschrift DAS 1 259 380 corresponding to a U.S. application. The 32 currents are supplied to the motion providing means of the deflection mirrors Usp 1 to 32 which are preferably galvanometer mirrors, and direct them towards the individual tracks.

In our example each one of the current outputs can deliver 175 different current values appropriate to the 175 individual tracks of each group of tracks.

It is advantageous to program the control device CD in the following way.

In the digital light deflection system 10 the modulated beam is assigned to channel 1. The first deflection mirror Usp 1 positions it to the first individual track of the first group of tracks Sp 1. After one revolution of the drum 1, i.e., when the first individual track is filled, the modulator 8 switches off the first light beam 6 and the other modulator 9 transfers the store information to the second light beam 7 which is assigned, via the light deflection system 10, to channel 17 and which is positioned, via the seventeenth deflection mirror Usp 17 on the first individual track of the seventeenth group of tracks Sp 17.

While this individual track is being filled, the first deflection mirror Usp 1 adjusts itself to the second individual track of the first group of tracks Sp 1; this individual track can be filled with the data after the first individual track of the seventeenth group of tracks Sp 17 has been filled and the modulators and the light deflection system have been appropriately switched.

If, in this manner, the groups of tracks 1 and 17 have been filled, the digital deflection system 10 switches to the groups of tracks 2 and 18 and the procedure here is a corresponding one.

Different substances are available as recording material. These must be materials which have a sufficiently high sensitivity with respect to the recording beams. The occurring discoloration is either irreversible or reversible, depending on the selection of the particular material. Such materials have already been proposed, and some are known, e.g., from U.S. Pat. No. 3,299,079.

Two readout methods can be used—destructive and nondestructive. For example, in the one in which the store information is destroyed by the readout process, light of the same wavelength as in the writing process is used for scanning. On the other hand, in an advantageous manner, a destruction-free readout process can be used in which the scanning of the information is accomplished with light of a wavelength which does not discolor those parts of the storage layer which were not previously discolored, preferably light of a wavelength which is greater than that used in the writing process.

The readout process can be accomplished in a manner analogous to the writing process in that the light serving for reading-out is positioned over the portion of the store which is to be read out by the same apparatus as in the writing process. At those points, where, corresponding with the store information, discoloration has occurred, the reading beam will not be able or only partially be able to penetrate into the interior of the drum constructed of transparent material and be deflected at the reflecting surface, as described, which separates the two parts of the drum body, whereas at all other points the beam will penetrate to the interior of the drum without difficulty. Depending on the inclination of this reflecting surface with respect to the direction of the impinging light beam, this beam is deflected. The angle of inclination is preferably 45° so that the beam is deflected by 90° and exits at the end face of drum 1. Light sensors 11, 12 are arranged opposite both end faces of the drum which sensors are provided with a receiving surface large enough that all light beams emitted across the radius of the frontal face can be accommodated. These light sensors 11, 12 convert the light signals into electrical signals which can be utilized according to the stored data for further processing. The light sensors can be, e.g., photomultipliers.

The components 1, Usp, and light sensors 11 and 12, are combined in FIG. 2 in block 13.

Since the light sensors 11, 12, as stated, exhibit a relatively large surface area, they furnish no information about the addresses of the readout data. This information can be derived, however, from the position of the deflection mirrors Usp and of the digital light deflection system 10 and the position of drum 1. It is also possible to construct the light sensors in such a manner that they are able to furnish address information, for example, by an appropriate grid pattern thereon.

In an advantageous manner the surface of the core 2 is constructed, as already stated, in the form of a double cone so that the store information of half of the groups of tracks Sp is fed into one light sensor and that of the other half of the groups of tracks Sp to the other light sensor which leads to a separation of the data flow furnished by the light sensors which is analogous to the separation of the data flow to be stored by the two recording light beams 6, 7.

The data storage system according to the present invention exhibits the already-mentioned advantage that with the use of a laser as the light generator a high light intensity is possible.

Such high light intensities permit the economical utilization of nonlinear optical effects in crystals for frequency doubling in that a material with a sufficiently high conversion factor and a simultaneously sufficient permeability for the irradiated frequency-doubled wavelength can be found.

The following nonlimiting examples for the data storage system according to the present invention are:

1. Writing with a UV laser, reading with a longer-wavelength emission line of the same laser.

e.g., Ar laser: writing at 0.351 $\mu$; reading at 0.488 $\mu$.

2. Writing with a UV laser, reading with the output beam of a second laser of longer emission wavelength and, if necessary, lesser output power.

e.g., writing $Ne^+$ at 0.322 $\mu$ or 0.338 $\mu$;
reading $Ar^+$ at 0.488 $\mu$ 3. Writing with the frequency-doubled radiation of a high-powered ion gas laser and reading with the undoubled primary radiation.

e.g., writing $Ar^+$ at $\frac{1}{2}\cdot 0.488\ \mu=0.244$;
reading $Ar^+$ at 0.488 $\mu$.

4. Writing with the frequency-doubled radiation of a higher-power ion gas laser and reading with the output beam of a second laser of longer emission wavelength and, if necessary, lesser output power.

The above-mentioned utilization of nonlinear optical effects makes possible, if required, an optimum adaptation of the writing and reading light wavelengths to the recording material.

If the drum is enlarged, this leads to an increased store capacity, the transfer rate of the system being correspondingly increased, however.

The access time of the system can be decreased by an increased rotational speed of the drum. However, assuming the diameter of the drum remains unchanged, this will either increase the transfer rate while the store capacity remains unchanged, or with unchanged transfer rate, the store capacity will be reduced, for a less number of bits is storable in one track at higher rotational speed of the drum 1.

A $2^n$-fold increase of the store capacity of the system can be achieved in that the digital light deflection system 10 can be expanded by $n$ stages and $2^n$ stores are provided together with their associated deflection mirrors Usp instead of only one drum store.

In this connection, a considerable advantage of the data storage system according to the present invention is that there is a reduced space requirement when compared to magnetic disc stores of otherwise comparable characteristics.

This advantage is particularly noticeable in the last-mentioned expansion of the store capacity by the provision of a plurality of drum stores since the space requirement is increased each time only by the volume of these additional drums including the deflection mirrors.

It will be understood that the above description of the present application is susceptible to various modifications, changes and adaptations.

We claim:

1. A data storage system having a large store capacity and a short access time comprising, in combination: a rotatable drum having a recording material which changes color under the influence of high-energy radiation applied to the surface thereof, as a data carrier, said drum including an inner core constructed as a circular double frustum with the bases meeting and an outer hollow part of transparent material, the angle of inclination of each frustum surface with respect to the base being 45°, the border surface between the core and the hollow part being arranged to reflect radiation;

means for producing laser light beams having high energy for providing the discoloring radiation and including movable deflection mirrors opposite the circumference of the drum for directing the high-energy discoloring beams to different individual data tracks on the drum;

a digital electro-optical light deflection system for distributing the beams to the individual deflection mirrors; and a light sensor disposed opposite each respective end face of the drum for converting light signals into electrical signals and having a length corresponding at least to the radius of the drum.

2. The system defined in claim 1 wherein the deflection mirrors include galvanometer mirrors.

3. The system defined in claim 1 further comprising electro-optical modulator means disposed between said light-producing means and said light deflection system for modulating the laser light beams in accordance with the data flow, said light-producing means producing two laser beams, said modulator means being arranged to selectively modulate one of said light beams and block the other of said light beams.

4. In a data storage system having a large store capacity and a short access time, the improvement comprising a rotatable drum having a recording material which changes color under the influence of high-energy radiation applied to the surface thereof as a data carrier, said drum including an inner core and an outer hollow portion, said core being constructed as a circular double frustum with the bases of the individual frustums meeting and the inclined surface of the core underlying the hollow portion being arranged to reflect radiation.

5. The system defined in claim 4 wherein the angle of inclination of each frustum surface with respect to the base is 45°.

6. The system defined in claim 4 wherein the hollow part is constructed of transparent material.

7. The system defined in claim 6 comprising light sensors disposed opposite at least one of the end faces of the drum for converting light signals into electrical signals.

8. The system defined in claim 7 wherein each light sensor has a length which corresponds at least to the radius of the drum.

9. A method for storing data for providing a large storage capacity and short access time, comprising the steps of:

providing a rotatable drum having a recording material on the surface thereof which changes color under the influence of high-energy radiation of a predetermined wavelength;

providing a pair of controlled laser beams;

during each revolution of the drum, alternately (1) directing one of said pair of laser beams onto an individual track on the periphery of the drum for selectively writing information onto said material and reading-out information from said material, said laser beam being of said predetermined wavelength during writing of information and being of a different wavelength during reading-out of information, and (2) blocking the other of the pair of laser beams while moving its direction to the track on the periphery of the drum desired during the next revolution of the drum; and, controlling the wavelength of the laser beams so as to provide light of a longer wavelength emission line for reading-out than for writing by doubling the frequency of the laser beam for writing while using the undoubled frequency for reading-out.

* * * * *